United States Patent
Balagopal et al.

(10) Patent No.: US 8,246,863 B2
(45) Date of Patent: Aug. 21, 2012

(54) ALKALI METAL SUPER IONIC CONDUCTING CERAMIC

(75) Inventors: Shekar Balagopal, Sandy, UT (US); Marc Flinders, West Valley, UT (US)

(73) Assignee: Ceramatec, Inc., Salt Lake City, UT (US)

(*) Notice: Subject to any disclaimer, the term of this patent is extended or adjusted under 35 U.S.C. 154(b) by 427 days.

(21) Appl. No.: 12/492,834

(22) Filed: Jun. 26, 2009

(65) Prior Publication Data
US 2010/0331170 A1   Dec. 30, 2010

(51) Int. Cl.
*H01B 1/06* (2006.01)
*C04B 35/14* (2006.01)
*B01D 71/02* (2006.01)

(52) U.S. Cl. ................ 252/519.14; 252/519.15
(58) Field of Classification Search .......... 252/519.14, 252/519.15; 429/495, 304
See application file for complete search history.

(56) References Cited

U.S. PATENT DOCUMENTS

| | | | |
|---|---|---|---|
| 4,097,345 A | 6/1978 | Shannon | |
| 4,119,503 A | 10/1978 | Spaziante et al. | |
| 4,248,715 A | 2/1981 | Olivier | |
| 4,686,012 A * | 8/1987 | Engell et al. ............ | 205/781.5 |
| 4,990,413 A | 2/1991 | Lee et al. | |
| 5,580,430 A * | 12/1996 | Balagopal et al. ......... | 204/252 |
| 2002/0192553 A1 | 12/2002 | Barker et al. | |
| 2005/0238961 A1 | 10/2005 | Barker et al. | |
| 2007/0158205 A1* | 7/2007 | Balagopal et al. ......... | 205/413 |
| 2008/0245671 A1 | 10/2008 | Balagopal et al. | |

OTHER PUBLICATIONS

Kim, Jun G., "Written Opinion of the International Searching Author", International App. No. PCT/US2010/038877, 1-3, mail Feb. 7, 2011.

Kim, Jun G., "Search Report of the International Searching Authority", International App. No. PCT/US2010/038877, 1-3, mail Feb. 7, 2011.

Shannon, R.D. "Ionic Conductivity in Na5YSi4O12 Type Silicates", *Inorganic Chemistry*, vol. 17, No. 4 (1978),958-964.

Goodenough, J.B. et al., "Fast Na+-Ion Transport in Skeleton Structures", *Mat. Res. Bull.*, vol. 11, Pergamon Press, Inc. Printed in the United States,(1976),203-220.

Bentzen, J. J., et al., "The preparation and characterization of dense, highly conductive Na5GdSi4O12 nasicon (NGS)", *Materials Research Bulletin*, vol. 15,(1980),1737-1745.

Delmas, C. et al., "Crystal chemistry of the Na1+xZr2-xLx(PO4)3 (L=Cr, In, Yb) solid solutions", *Materials Research Bulletin*, vol. 16,(1981),285-290.

Fujitsu, S. et al., "Conduction paths in sintered ionic conductive material Na1+xYxZr2-x(PO4)3", *Materials Research Bulletin*, vol. 16,(1981),1299-1309.

Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58,(1992),327-331.

Alamo, J. "Chemistry and properties of solids with the [NZP] skeleton", *Solid State Ionics*, vol. 63-65,(1993),547-561.

(Continued)

*Primary Examiner* — Mark Kopec
(74) *Attorney, Agent, or Firm* — David Fonda (57) ABSTRACT

Metal ion conducting ceramic materials are disclosed having characteristics of high ion conductivity for certain alkali and monovalent metal ions at low temperatures, high selectivity for the metal ions, good current efficiency and stability in water and corrosive media under static and electrochemical conditions. The metal ion conducting ceramic materials are fabricated to be deficient in the metal ion. One general formulation of the metal ion conducting ceramic materials is $Me_{1+x+y-z}M^{III}_{y}M^{IV}_{2-y}Si_xP_{3-x}O_{12-z/2}$, wherein Me is $Na^+$, $Li^+$, $K^+$, $Rb^+$, $Cs^+$, $Ag^+$, or mixtures thereof, $2.0 \leq x \leq 2.4$, $0.0 \leq y \leq 1.0$, and $0.05 \leq z \leq 0.9$, where $M^{III}$ is $Al^{3+}$, $Ga^{3+}$, $Cr^{3+}$, $Sc^{3+}$, $Fe^{3+}$, $In^{3+}$, $Yb^{3+}$, $Y^{3+}$, or mixtures thereof and $M^{IV}$ is $Ti^{4+}$, $Zr^{4+}$, $Hf^{4+}$, or mixtures thereof.

21 Claims, 3 Drawing Sheets

OTHER PUBLICATIONS

Shimazu, K. et al., "Electrical conductivity and Ti4+ ion substitution range in NASICON system", *Solid State Ionics*, vol. 79, (1995),106-110.

Miyajima, Y. et al., "Ionic conductivity of NASICON-type Na1+xMxZr2-xP3O12(M: Yb, Er, Dy)", *Solid State Ionics*, vol. 84,(1996),61-64.

Hong, "Crystal Structures and Crystal Chemistry in the System Na1+xMxZr2-xP3O12", *Materials Research Bulletin*, 11(2), (1976),173-182.

Miyajima, et al., "Solubility Rang and Ionic Conductivity of Large Trivalent Ion Doped Na1+xMxZr2-xP3O12 (M: In, Yb, Er, Y, Dy, Tb, Gd) Solid Electrolytes", *Solid State Ionics* 123(3-4), (1999),201-211.

Tillement, et al., "Mixed Conductivity of the NASICON phase Na2+x+yZr1-yFeIIxFeIII1-x+y(PO4)3", *Solid State Ionics* 44(3-4), (1991),299-303.

Mariappan, et al., "Frequency Dependent Electrical Properties of the Na3Fe2P3O12 and Na4FeCdP3O12 NASICON Material", *Solid State Ionics: Trends in the New Millenium*, (2002),629-636.

Fuentes, et al., "Submicrometric NASICON Ceramics With Improved Electrical Conductivity Obtained From Mechanic ally Activated Precursors", *Journal of the European Ceramic Society*, 25(4), (2005),455-462.

Fuentes, et al., "Influence of Microstructure on the Electical Properties of NASICON Materials", *Solid State Ionics* 140(1-2), (2001),173-179.

Fuentes, et al., "Reaction of NASICON With Water", *Solid State Ionics*, 139(3-4), (2001),309-314.

Fuentes, et al., "Optimised NASICON Ceramics for Na+ Sensing", *Ionics*, 8(5), (2002),383-390.

Smirnova, et al., "Stability and Thermal Expansion of Na+ Conducting Ceramics", *Journal of Electroceramics*, 11(3), (2003),179-189.

Clearfield, et al., "Preparation of Sodium Zirconium Phosphates of the Type Na1+4xZr2-x(PO4)3", *Materials Research Bulletin* 18(12), (1983),1561-1567.

Rudolf, et al., "The Crystal Structure of a Nonstoichiometric NASICON", *Materials Research Bulletin*, 20(6), (1985),643-651.

Von Alpen, et al., "Compositional Dependence of the Electrochemical and Structural Parameters in the NASICON System (Na1+xSixZr2P3-xO12)", *Solid State Ionics*, 3-4, (1981),215-218.

Delmas, et al., "The NASICON-Type Titanium Phosphates ATi2(PO4)3 (A=Lithium, Sodium) as Electrode Materials", *Solid State Ionics*, 28-30(Pt. 1), (1988),419-23.

Tillement, et al., "Crystal Chemistry and Electrical Study of Sodium Niobium Titanium Phosphate (NaxNbTi(PO4)3)", *Solid State Ionics*, 48(3-4), (1988),249-255.

Tillement, et al., "Electrochemical Studies of Mixed Valence Nasicon", *Solid State Ionics*, 53-56(Pt. 1), (1992),391-399.

Znaidi, et al., "Crystal Chemistry and Electrical Properties of Na1+xScNb(PO4)3 Phases", *Solid State Ionics*, 93(3,4), (1997),273-277.

Patoux, et al., "Structural and Electrochemical Studies of Rhombohedral Na2TiM(PO4)3 and Li1.6Na0.4TiM(PO4)3 (M=Fe, Cr) Phosphates", *Chem. Mater. 15*, (2003),2084-2093.

\* cited by examiner

ALKALI METAL SUPER IONIC CONDUCTING CERAMIC

FIELD OF THE INVENTION

The invention relates to metal ion conducting ceramic materials having characteristics of high ion conductivity for certain alkali and monovalent metal ions at low temperatures, high selectivity for the metal ions, good current efficiency and stability in water and corrosive media under static and electrochemical conditions. The metal ion conducting ceramic materials include the type known as MeSICON (Metal Super Ionic CONductor) materials. Where the metal is sodium (NaSICON materials), the invention includes the complete or partial substitution of alkali metal ions such as $Li^+$, $K^+$, $Rb^+$, and $Cs^+$ as well as monovalent silver ions, $Ag^+$, into the sodium sites of the disclosed NaSICON materials. The disclosed metal ion ceramic materials are useful in many applications, but especially in electrolytic systems involving electrolytic reactions of solutions containing alkali metal ions.

BACKGROUND OF THE INVENTION

NaSICON materials were first reported by Hong[1] in 1976. The Hong formulation is a series of solid solutions between the end members $NaZr_2(PO_4)_3$ (also known as NZP) and $Na_4Zr_2(SiO_4)_3$, expressed by the general formula:

$$Na_{1+x}Zr_2Si_xP_{3-x}O_{12} \qquad (1)$$

Where x varies from 0-3 ($0 \leq x \leq 3$). The variable 'x' is the amount of Si substituted for P into 1 mole of NZP. Because silicon has a valence of +4 and phosphorus has a valence of +5, an additional mole of $Na^+$ must be added for each mole of $P^{5+}$ substituted to maintain charge neutrality. While the $Si^{4+}$ additions are known to directly substitute into the lattice sites formerly occupied by the $P^{5+}$ ions, the additional $Na^+$ ions are known to occupy one of two or three equivalent lattice sites not fully occupied by sodium ions in any of the NaSICON compositions for which x<3.

Other exemplary NaSICON-type materials are described by J. B. Goodenough et al., in "Fast $Na^+$-ion transport skeleton structures", Materials Research Bulletin, Vol. 11, pp. 203-220, 1976; J. J. Bentzen et al., in "The preparation and characterization of dense, highly conductive $Na_5GdSi_4O_{12}$ nasicon (NGS)", Materials Research Bulletin, Vol. 15, pp. 1737-1745, 1980; C. Delmas et al., in "Crystal chemistry of the $Na_{1+x}Zr_{2-x}L_x(PO_4)_3$ (L=Cr, In, Yb) solid solutions", Materials Research Bulletin, Vol. 16, pp. 285-290, 1981; V. von Alpen et a., in "Compositional dependence of the electrochemical and structural parameters in the NASICON system ", Solid State Ionics, Vol. 3/4, pp. 215-218, 1981; S. Fujitsu et al., in "Conduction paths in sintered ionic conductive material $Na_{1+x}Y_xZr_{2-x}(PO_4)_3$", Materials Research Bulletin, Vol. 16, pp. 1299-1309, 1981; Y. Saito et a., in "Ionic conductivity of NASICON-type conductors $Na_{1.5}M_{0.5}Zr_{1.5}(PO_4)_3$ (M: $Al^{3+}$, $Ga^{3+}$, $Cr^{3+}$, $Sc^{3+}$, $Fe^{3+}$, $In^{3+}$, $Yb^{3+}$, $Y^{3+}$)", Solid State Ionics, Vol. 58, pp. 327-331, 1992; J. Alamo in "Chemistry and properties of solids with the [NZP] skeleton", Solid State Ionics, Vol. 63-65, pp. 547-561, 1993; K. Shimazu in "Electrical conductivity and $Ti^{4+}$ ion substitution range in NASICON system", Solid State Ionics, Vol. 79, pp. 106-110, 1995; Y. Miyajima in "Ionic conductivity of NASICON-type $Na_{1+x}M_xZr_{2-x}P_3O_{12}$ (M:Yb, Er, Dy)", Solid State Ionics, Vol. 84, pp. 61-64, 1996.

Numerous variations in the basic Hong formulation have already been reported in the literature. These include ionic substitutions of all four cations (Na, Zr, P, S), some of which include the addition or removal of the Na. The original paper by Hong listed substitutions of $Li^+$, $Ag^+$ and $K^+$ for the $Na^+$ in the crystal structure. Other substitutions have included full or partial replacements of Zr with Ti, In[2, 3] and several other transition metal[4, 5] and rare earth elements. In all cases, for elements with lower valence than +4, additional $Na^+$ is added to the formulation to maintain stoichiometry of the original NaSICON material. Technical papers have claimed this 1) reduces the sintering temperature of the NaSICON; 2) reduces the free $ZrO_2$ in the sintered microstructure; 3) increases the stability of the NaSICON (particularly with water); or 4) increases the conductivity of the material. In any case, the more general formula for NaSICON ceramics can be expressed as containing materials can be expressed as $Me_{1+x+y}M^{III}{}_yM^{IV}{}_{2-y}Si_xP_{3-x}O_{12}$, where Me is the alkali or monovalent metal ion, $M^{III}$ is a +3 cation and $M^{IV}$ is a +4 cation. All materials reported in the literature have the same crystal structure and same basic microstructural characteristics and similar baseline Hong formulations, usually with only minor changes in lattice parameters and ionic conductivities of the ceramic.

Other variations in the formulation of NaSICON reported in the literature have included the making of the ceramic that is Zr-deficient, and in some cases adjusted to be Na-rich to maintain stoichiometry. Papers[11, 12] report the substitution of $Na^+$ into the $Zr^{4+}$ lattice sites in these compositions. Others report compositions deficient in Zr that are non-stoichiometric, with resulting vacancies in the $O^{2-}$ anion sub-lattice. Most notably is the compositions first reported by von Alpen [13] of $Na_{1+x}Zr_{2-x/3}Si_xP_{3-x}O_{12-2x/3}$.

Several compositions of MeSICON family of materials are disclosed herein. These materials include NaSICON type materials where the metal ion is sodium and several compositions of alkali-ion conducting ceramic materials based upon the disclosed NaSICON materials. These compositions are fundamentally based on the Hong formulation, first reported on in 1976[1], but vary from Hong's chemistries in one important respect—they are made to be metal ion deficient from the baseline formulation $Me_{1+x+y-z}M^{III}{}_yM^{IV}{}_{2-y}Si_xP_{3-x}O_{12-z/2}$. This distinction appears to be unique to all other literature reported on the subject of NaSICON type materials.

BRIEF SUMMARY OF THE INVENTION

In accordance with the present invention, there is provided a metal ion conducting ceramic material having characteristics of high ion conductivity for certain alkali and monovalent metal ions at low temperatures, high selectivity for the metal ions, good current efficiency and stability in water and corrosive media under static and electrochemical conditions. The metal ion conducting ceramic materials include the type known as MeSICON (Metal Super Ionic CONductor) materials having the general formulation:

$$Me_{1+x+y-z}M^{III}{}_yM^{IV}{}_{2-y}Si_xP_{3-x}O_{12-z/2} \qquad (2)$$

Wherein Me is $Na^+$, $Li^+$, $K^+$, $Rb^+$, $Cs^+$, or $Ag^+$, or mixtures thereof, $2.0 \leq x \leq 2.4$, $0.0 \leq y \leq 1.0$, and $0.05 \leq z \leq 0.90$, where $M^{III}$ is $Al^{3+}$, $Ga^{3+}$, $Cr^{3+}$, $Sc^{3+}$, $Fe^{3+}$, $In^{3+}$, $Yb^{3+}$, $Y^{3+}$, or mixtures thereof and $M^{IV}$ is $Ti^{4+}$, $Zr^{4+}$, $Hf^{4+}$, or mixtures thereof.

In some non-limiting embodiments, the resulting MeSICON material includes the partial substitution of Me with a different alkali metal ion or monovalent metal ion selected from $Na^+$, $Li^+$, $K^+$, $Rb^+$, $Cs^+$, $Ag^+$, or mixtures thereof.

In some preferred embodiments, Me is an alkali ion or other monovalent metal ion. In some embodiments, $2.2 \leq x \leq 2.4$. In some embodiments, $0.0 \leq y \leq 0.12$. In some embodiments, $0.05 \leq z \leq 0.3$.

In one embodiment, x is about 2.2, y is about 0.05, and z is about 0.25 and the metal ion conductive ceramic material has a formula $Na_{2.999}Y_{0.049}Zr_{1.951}Si_{2.2}P_{0.8}O_{11.875}$. In one embodiment, x is about 2.3, y is about 0.0, and z is about 0.9 and the metal ion conductive ceramic material has a formula $Na_{2.4}Zr_2Si_{2.3}P_{0.7}O_{11.55}$. In one embodiment, x is about 2.3, y is about 0.05, and z is about 0.8 and the metal ion conductive ceramic material has a formula $Na_{2.549}Y_{0.049}Zr_{1.951}Si_{2.3}P_{0.7}O_{11.6}$. In one embodiment, x is about 2.4, y is about 0.0, and z is about 0.9 and the metal ion conductive ceramic material has a formula $Na_{2.5}Zr_2Si_{2.4}P_{0.6}O_{11.55}$. In one embodiment, x is about 2.4, y is about 0.0, and z is about 0.8 and the metal ion conductive ceramic material has a formula $Na_{2.6}Zr_2Si_{2.4}P_{0.6}O_{11.6}$.

Other advantages and aspects of the present invention will become apparent upon reading the following description of the drawings and detailed description of the invention. These and other features and advantages of the present invention will become more fully apparent from the following figures, description, and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
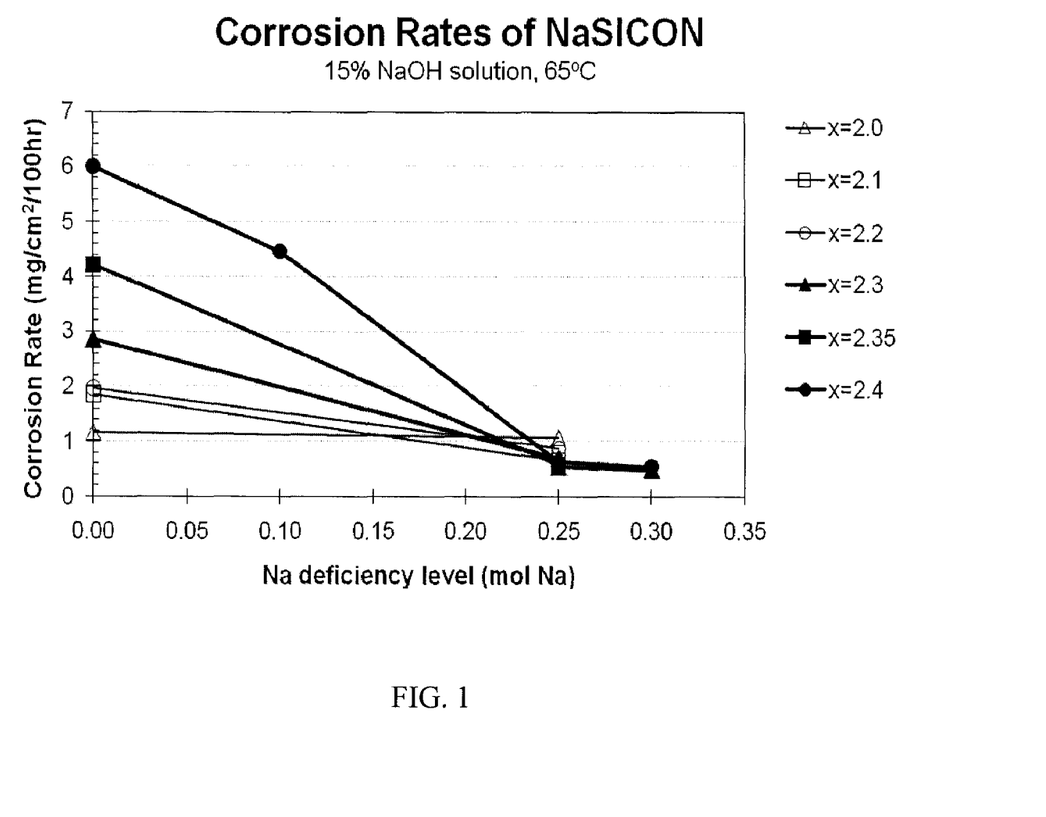
FIG. 1 is a graph of the chemical stability of various sodium deficient NaSICON compositions measured as a corrosion rate from exposure to 15 wt % NaOH solution at 65° C.
Figure 2:
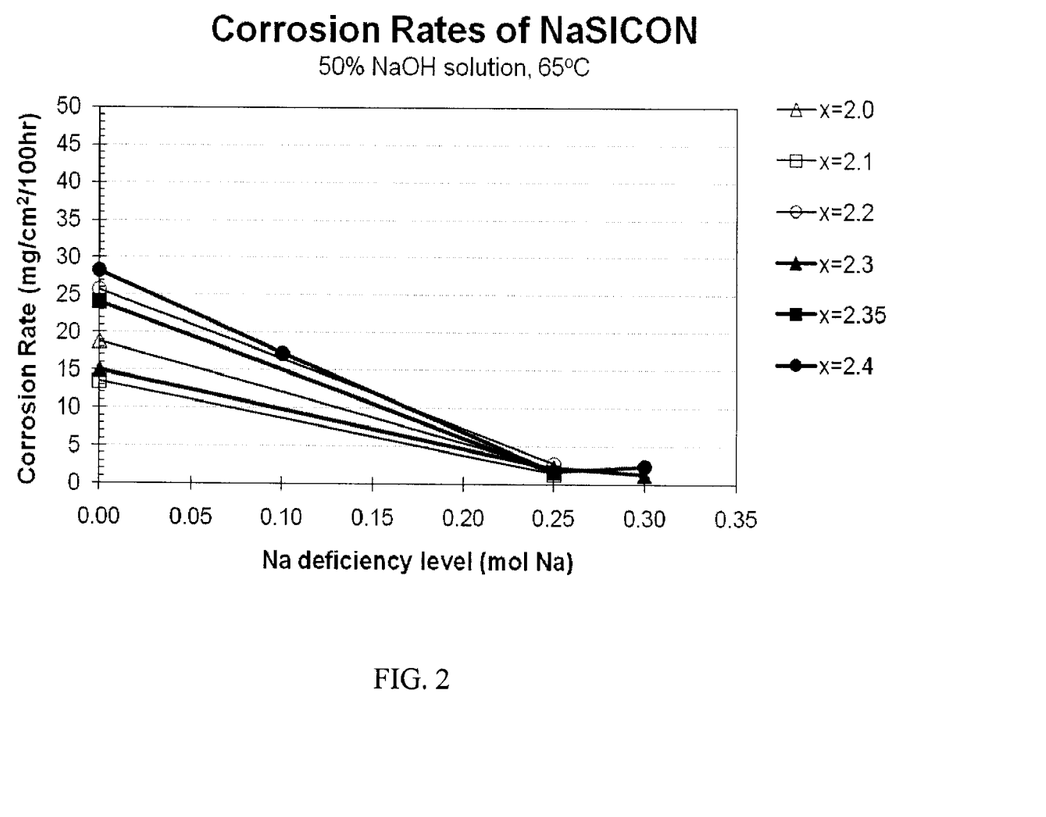
FIG. 2 is a graph of the chemical stability of various sodium deficient NaSICON compositions measured as a corrosion rate from exposure to 50 wt % NaOH solution at 65° C.

The presently preferred embodiments of the metal ion conducting ceramic materials within the scope of the present invention will be best understood by reference to the following description and related drawings. It being understood that the following more detailed description of the metal ion conducting ceramic materials within the scope of the present invention as represented in FIGS. 1 and 2 is not intended to limit the scope of the invention, as claimed, but is merely representative of some presently preferred embodiments of the invention.

While metal ion conducting ceramic materials disclosed herein encompass or include many formulations of MeSICON, they are based upon NaSICON chemistries, being Na-deficient and non-stoichiometric variation of the Hong's NaSICON material, $Na_{1+x}Zr_2Si_xP_{3-x}O_{12}$, (formulation (1) identified above) where x varies from 0-3 ($0 \leq x \leq 3$). Specifically, compositions made with 0.05-0.9 moles less Na than in Hong's formulation result in a material with the same basic crystal structure and higher electrical properties as materials reported in the literature. In addition, these materials have improved corrosion resistance to highly basic aqueous solutions in the temperature rages of 20-150° C. No such compositions or claims of improved performance have been found thus far in the literature.

The foregoing general formulation with respect to sodium ($Na_{1+x}Zr_2Si_xP_{3-x}O_{12}$) may be rewritten to be sodium deficient and adapted to alkali metal ions, such as $Na^+$, $Li^+$, $K^+$, $Rb^+$, and $Cs^+$, and to certain monovalent metal ions, such as $Ag^+$, and mixtures thereof. A metal ion conducting ceramic material having a structure providing high metal cation conductivity within the scope of the present invention has the general formulation:

$$Me_{1+x+y-z}M^{III}{}_yM^{IV}{}_{2-y}Si_xP_{3-x}O_{12-z/2} \quad (2)$$

Wherein Me is $Na^+$, $Li^+$, $K^+$, $Rb^+$, $Cs^+$, or $Ag^+$, or mixtures thereof, $2.0 \leq x \leq 2.4$, $0.0 \leq y \leq 1.0$, and $0.05 \leq z \leq 0.9$, where $M^{III}$ is $Al^{3+}$, $Ga^{3+}$, $Cr^{3+}$, $Sc^{3+}$, $Fe^{3+}$, $In^{3+}$, $Yb^{3+}$, $Y^{3+}$, or mixtures thereof and $M^{IV}$ is $Ti^{4+}$, $Zr^{4+}$, $Hf^{4+}$, or mixtures thereof. The total Me content must remain below 4, as there are only 4 Me sites per unit formula in the lattice. Because the composition may range for x from 2.0-2.4, for y from 0.0-1.0, and for z from 0.05-0.9, and the total Me should be 1+x+y-z, this restricts the value of z to be greater than or equal to x+y-3. That is, $z \geq (x+y-3)$.

Using this nomenclature, 'x' is the level of Si substitution for P in the basic Hong formulation, 'y' is the level of substitution of $M^{III}$ for $M^{IV}$ as has been reported by several others, and 'z' is the level of metal ion deficiency in the material, from the baseline Hong stoichiometry, compensated by 'z/2' oxygen vacancies.

A general formulation can be expressed for each specific metal ion. For example, where Me is Na, $M^{III}$ is Y, and $M^{IV}$ is Zr, a general formulation for the sodium deficient materials can be expressed as follows:

$$Na_{1+x+y-z}Y_yZr_{2-y}Si_xP_{3-x}O_{12-(z/2)} \quad (3)$$

Wherein $2.0 \leq x \leq 2.4$, $0.0 \leq y \leq 1.0$, and $0.05 \leq z \leq 0.9$. Using this nomenclature, 'x' is the level of Si substitution for P in the basic Hong formulation, 'y' is the level of substitution of Y for Zr as has been reported by several others, and 'z' is the level of Na deficiency in the material, from the baseline Hong stoichiometry, compensated by 'z/2' oxygen vacancies.

There are a variety of literature reported materials with compositions similar to the basic Hong formulations and with the same crystal structure, fabricated for use in sodium intercalation, where $Na^+$ ions are added and removed from the structure as part of an electrochemical cell reaction. See, references 14-19 listed in the References section below. This addition and removal of sodium ions is accompanied by the addition and removal of electrons and a change in valence of another cation in the structure (most typically the Zr in the structure substituted for a multivalent metal ion). In contrast, the sodium deficiencies in the metal ion conducting ceramic materials within the scope of the present invention are compensated by vacancies in the oxygen sub-lattice (Ionic substitution), and are not due to the net removal of sodium ions.

The following examples discuss specific embodiments within the scope of the invention. These embodiments are exemplary in nature and should not be construed to limit the scope of the invention in any way.

EXAMPLE 1

Examples of sodium deficient NaSICON type materials that have been fabricated, analyzed, and tested include, but are not limited to, several material formulae set forth in Table 1. Table 1 also includes some NaSICON type materials that are not sodium deficient for comparative purposes.

TABLE 1

| Designation | x | y | z | NaSICON Material Formula |
|---|---|---|---|---|
| A-01 | 2 | 0 | 0 | $Na_3Zr_2Si_2PO_{12}$ |
| A-02 | 2 | 0.049 | 0 | $Na_{3.049}Y_{0.049}Zr_{1.951}Si_2PO_{12}$ |
| A-03 | 2.1 | 0 | 0 | $Na_{3.1}Zr_2Si_{2.1}P_{0.9}O_{12}$ |
| A-04 | 2.2 | 0 | 0 | $Na_{3.2}Zr_2Si_{2.2}P_{0.8}O_{12}$ |
| A-05 | 2.3 | 0 | 0 | $Na_{3.3}Zr_2Si_{2.3}P_{0.7}O_{12}$ |
| A-06 | 2.3 | 0.049 | 0 | $Na_{3.349}Y_{0.049}Zr_{1.951}Si_{2.3}P_{0.7}O_{12}$ |
| A-07 | 2.35 | 0 | 0 | $Na_{3.35}Zr_2Si_{2.35}P_{0.65}O_{12}$ |
| A-08 | 2.4 | 0 | 0 | $Na_{3.4}Zr_2Si_{2.4}P_{0.6}O_{12}$ |
| A-09 | 2.4 | 0.049 | 0 | $Na_{3.449}Y_{0.049}Zr_{1.951}Si_{2.4}P_{0.6}O_{12}$ |
| B-01 | 2 | 0 | 0.2 | $Na_{2.8}Zr_2Si_2PO_{11.9}$ |
| B-02 | 2 | 0 | 0.25 | $Na_{2.75}Zr_2Si_2PO_{11.875}$ |
| B-03 | 2 | 0.03 | 0.25 | $Na_{2.78}Y_{0.03}Zr_{1.97}Si_2PO_{11.875}$ |
| B-04 | 2 | 0.049 | 0.25 | $Na_{2.799}Y_{0.049}Zr_{1.951}Si_2PO_{11.875}$ |
| B-05 | 2 | 0.12 | 0.25 | $Na_{2.87}Y_{0.12}Zr_{1.88}Si_2PO_{11.875}$ |
| C-01 | 2.1 | 0 | 0.25 | $Na_{2.85}Zr_2Si_{2.1}P_{0.9}O_{11.875}$ |
| D-01 | 2.2 | 0 | 0.2 | $Na_{3.0}Zr_2Si_{2.2}P_{0.8}O_{11.9}$ |
| D-02 | 2.2 | 0 | 0.25 | $Na_{2.95}Zr_2Si_{2.2}P_{0.8}O_{11.875}$ |
| D-03 | 2.2 | 0.049 | 0.25 | $Na_{2.999}Y_{0.049}Zr_{1.951}Si_{2.2}P_{0.8}O_{11.875}$ |
| E-01 | 2.3 | 0.049 | 0.05 | $Na_{3.299}Y_{0.049}Zr_{1.951}Si_{2.3}P_{0.7}O_{11.975}$ |
| E-02 | 2.3 | 0.049 | 0.15 | $Na_{3.199}Y_{0.049}Zr_{1.951}Si_{2.3}P_{0.7}O_{11.925}$ |
| E-03 | 2.3 | 0 | 0.2 | $Na_{3.1}Zr_2Si_{2.3}P_{0.7}O_{11.9}$ |
| E-04 | 2.3 | 0.049 | 0.249 | $Na_{3.1}Y_{0.049}Zr_{1.951}Si_{2.3}P_{0.7}O_{11.8755}$ |
| E-05 | 2.3 | 0 | 0.25 | $Na_{3.05}Zr_2Si_{2.3}P_{0.7}O_{11.875}$ |
| E-06 | 2.3 | 0.03 | 0.25 | $Na_{3.08}Y_{0.03}Zr_{1.97}Si_{2.3}P_{0.7}O_{11.875}$ |
| E-07 | 2.3 | 0.12 | 0.25 | $Na_{3.17}Y_{0.12}Zr_{1.88}Si_{2.3}P_{0.7}O_{11.875}$ |
| E-08 | 2.3 | 0 | 0.3 | $Na_{3.0}Zr_2Si_{2.3}P_{0.7}O_{11.85}$ |
| E-09 | 2.3 | 0.049 | 0.5 | $Na_{2.849}Y_{0.049}Zr_{1.951}Si_{2.3}P_{0.7}O_{11.75}$ |
| F-01 | 2.35 | 0 | 0.25 | $Na_{3.1}Zr_2Si_{2.35}P_{0.65}O_{11.875}$ |
| F-02 | 2.35 | 0.049 | 0.25 | $Na_{3.149}Y_{0.049}Zr_{1.951}Si_{2.35}P_{0.65}O_{11.875}$ |
| G-01 | 2.4 | 0 | 0.1 | $Na_{3.3}Zr_2Si_{2.4}P_{0.6}O_{11.95}$ |
| G-02 | 2.4 | 0 | 0.25 | $Na_{3.15}Zr_2Si_{2.4}P_{0.6}O_{11.875}$ |
| G-03 | 2.4 | 0.03 | 0.25 | $Na_{3.18}Y_{0.03}Zr_{1.97}Si_{2.4}P_{0.6}O_{11.875}$ |
| G-04 | 2.4 | 0.049 | 0.25 | $Na_{3.199}Y_{0.049}Zr_{1.951}Si_{2.4}P_{0.6}O_{11.875}$ |
| G-05 | 2.4 | 0.12 | 0.25 | $Na_{3.27}Y_{0.12}Zr_{1.88}Si_{2.4}P_{0.6}O_{11.875}$ |
| G-06 | 2.4 | 0 | 0.3 | $Na_{3.1}Zr_2Si_{2.4}P_{0.6}O_{11.85}$ |

All compositions disclosed in Table 1 were sintered to >96% theoretical density with less than 0.1% open porosity, have been made into hermetically leak tight membranes, and have been tested and shown to be stable in aqueous sodium solutions and have high levels of conductivity (>1 mS/cm). All compositions were processed using solid state chemistry techniques described herein. All compositions were shown by XRD to have the same crystal structure as the baseline Hong formulated NaSICONs, all of which have had monoclinic crystal symmetry—consistent with their sodium stoichiometric counterparts. Among other advantages, compositions tested have shown an improved chemical stability when exposed to high concentrations of NaOH in water (>15 wt. %) in temperature ranges from 20-65° C. over their sodium stoichiometric counterparts.

Compositions within the scope of the present invention have been shown to possess high ion conductivity, that is, conductivity greater than about 1 mS/cm at room temperature. Compositions also possess good conductivity at temperatures below 200° C., and more preferably at low temperatures below about 100° C. to 150° C. Compositions within the scope of the present invention have been shown to possess high metal ion selectivity, greater than 98% selectivity for the metal ion.

EXAMPLE 2

Chemical Stability of NaSICON Compositions

Several different NaSICON membrane compositions were exposed to LLW (Low level radioactively contaminated sodium salt based waste) simulant chemistry and the caustic NaOH solutions without the influence of an electric field. Exposure tests were conducted at about 60° C. for 168 hr (1 week) in three different solutions: a 15 wt. % NaOH aqueous solution (the composition of the baseline catholyte solution), a stock radioactive simulant "AP104" solution with a Na:K ratio of roughly 50:1, and the same "AP104" solution with enough KOH added to bring the Na:K ratio to 7:1 simulating the highest K concentration that the membranes may be exposed to in the actual LLW. The results are presented in Table 2 below, in most cases, the corrosion level was notably lower in the 50:1 solution when compared to the 15 wt. % NaOH.

TABLE 2

Corrosion rates on baseline NaSICON materials.

| NaSICON material | Corrosion Rates (mg/cm²/100 hr) | | |
|---|---|---|---|
| | 15 wt. % NaOH | "AP104", 50:1 Na:K | "AP104", 7:1 Na:K |
| A-01 | 0.97 ± 0.10 | 1.29 ± 0.62 | 3.11 ± 0.16 |
| A-04 | 4.64 ± 0.78 | 0.45 ± 0.07 | 0.77 ± 0.13 |
| E-04 | 0.80 ± 0.06 | 0.19 ± 0.02 | 0.28 ± 0.03 |
| A-08 | 2.74 ± 0.11 | 0.52 ± 0.06 | 0.38 ± 0.11 |

Overall, the best material was believed to be NAS-GY composition. The NAS-G material has been previously tested in exposure experiments for over three months in LLW simulant without any noticeable impact on chemical stability.

FIGS. 1 and 2 present the results of corrosion resistance study for the sodium deficient NaSICON ceramics. From corrosion rate results reported in FIGS. 1 and 2, the sodium deficient compositions where x=2.3 and x=2.4 show the minimum most corrosion from exposure to caustic and to a simulated waste stream solutions. Additional corrosion results are included in Table 3:

TABLE 3

Corrosion rates on additional NaSICON materials.

| NaSICON material | Corrosion Rates (mg/cm²/100 hr) | |
|---|---|---|
| | 15% NaOH | 50% NaOH |
| A-03 | 1.85 ± 0.49 | 13.41 ± 4.53 |
| A-04 | 4.22 ± 0.77 | 24.04 ± 0.08 |
| A-05 | 2.86 ± 1.18 | 15.02 ± 2.69 |
| A-06 | 1.62 ± 0.71 | 44.45 ± 0.00 |
| A-09 | 3.24 ± 0.95 | 35.37 ± 0.28 |
| B-02 | 1.07 ± 0.10 | 2.16 ± 0.48 |
| B-03 | 0.88 ± 0.02 | 3.53 ± 0.25 |
| B-04 | 0.68 ± 0.17 | 3.32 ± 0.07 |
| B-05 | 0.56 ± 0.06 | 2.47 ± 0.35 |
| C-01 | 0.66 ± 0.16 | 1.44 ± 0.28 |
| D-02 | 0.87 ± 0.07 | 2.72 ± 0.04 |
| D-03 | 0.42 ± 0.17 | 1.83 ± 0.03 |
| E-05 | 0.54 ± 0.10 | 2.3 ± 0.19 |
| E-08 | 0.49 ± 0.08 | 1.32 ± 0.30 |
| E-09 | 1.02 ± 0.21 | 2.87 ± 0.46 |
| F-01 | 0.57 ± 0.10 | 1.6 ± 0.23 |
| F-02 | 0.38 ± 0.11 | 1.73 ± 0.33 |
| G-02 | 0.63 ± 0.14 | 1.68 ± 0.34 |
| G-03 | 0.64 ± 0.15 | 3.12 ± 0.10 |
| G-04 | 0.7 ± 0.07 | 3.53 ± 0.17 |
| G-05 | 0.87 ± 0.02 | 7.73 ± 0.22 |
| G-06 | 0.55 ± 0.00 | 2.37 ± 0.11 |

EXAMPLE 3

Figure 3:
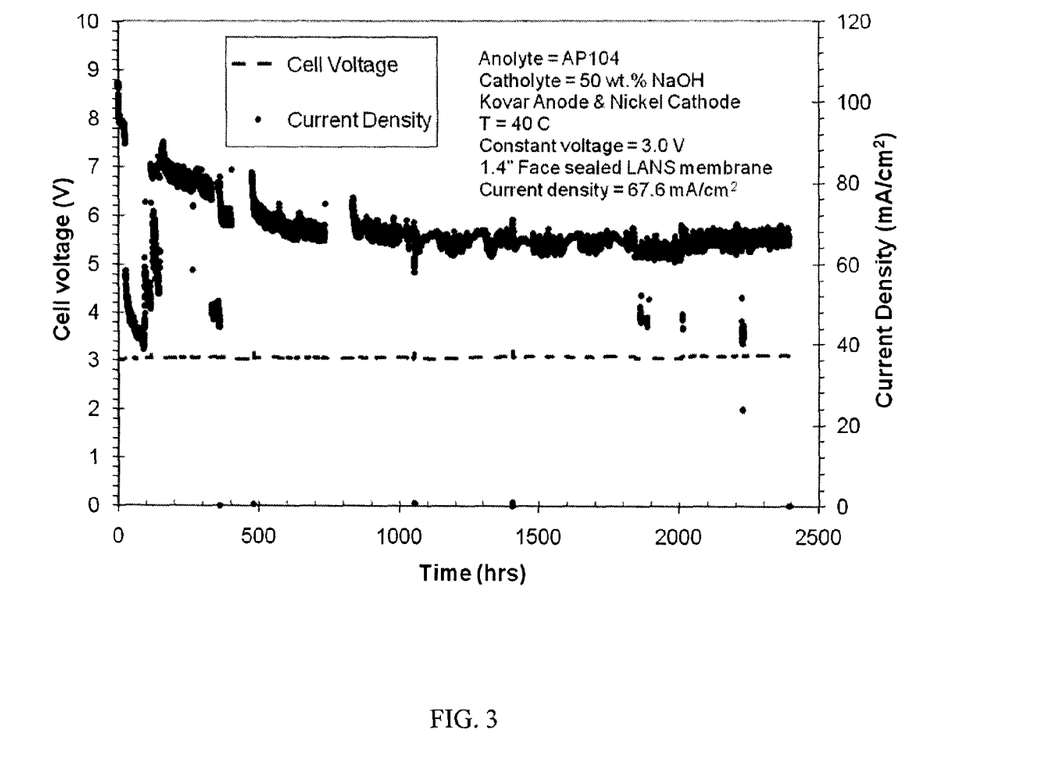
FIG. 3 is a graph of cell voltage and current density as a function of time for Example 3.

A NaSICON-type membrane electrolytic cell was operated in AP104 mixed sodium salt anolyte stream which simulates LLW simulant chemistry and 50% wt. % NaOH catholyte. The two compartment E-04 membrane electrolytic cell was operated to recycle and synthesize NaOH from an aqueous stream containing mixed sodium salts. The cell voltage (V) and current density (mA/cm$^2$) during operation of the cell over about 2400 hours is presented in FIG. 3. The cell voltage was maintained at a constant voltage of 3 volts.

The sodium ion conductivity for select compositions is presented in Table 4:

TABLE 4

Sodium Ion Conductivity of NaSICON materials.

| NaSICON Material | Sodium Ion Conductivity (mS/cm) at 40° C. | |
| --- | --- | --- |
|  | 2-probe | 4-probe method |
| A-01 | 2.98 ± 0.10 | |
| A-03 | 3.49 ± 0.28 | |
| A-04 | 4.43 ± 0.14 | |
| A-05 | 5.77 ± 0.22 | |
| A-07 | 8.50 ± 0.49 | |
| A-08 | 8.22 ± 0.26 | 9.38 |
| B-02 | 1.44 ± 0.07 | |
| B-03 | 1.53 ± 0.07 | |
| B-04 | 1.78 ± 0.08 | |
| B-05 | 4.07 ± 0.1 | |
| C-01 | 2.02 ± 0.11 | |
| D-02 | 3.76 ± 0.08 | |
| D-03 | 4.44 ± 0.14 | |
| E-04 | 5.49 ± 0.36 | 7.08 |
| E-05 | 6.37 ± 0.26 | |
| E-06 | 4.95 ± 0.10 | |
| E-08 | 6.20 ± 0.39 | |
| F-01 | 5.08 ± 0.19 | |
| F-02 | 6.09 ± 0.24 | |
| G-01 | | 14.4 |
| G-02 | 6.26 ± 0.14 | |
| G-03 | 4.85 ± 0.33 | |
| G-04 | 6.83 ± 0.21 | |
| G-05 | 5.65 ± 0.37 | |
| A-01 | 2.98 ± 0.10 | |

Exposing the NaSICON ceramic samples to NaOH caustic had minimal effect on the strength of the samples. The distribution of the data (Weibull modulus) remained just as insensitive to the exposure conditions, and examination of the fractures revealed no indication of significant changes to the material. Materials were examined under the SEM/EDS and several were scanned using XRD to determine changes in the material before and after exposure. XRD revealed no significant changes in the phase assemblage of the material during exposure, and no statistically significant change in lattice parameters in the crystal structure. With no electrical driving force, diffusion of K$^+$ in to the structure in appreciable amounts was limited to very near the surface; enough to remove material as the lattice expanded, but not deep enough to be detectable by XRD.

EXAMPLE 4

Additional examples of sodium deficient NaSICON type materials are fabricated, analyzed, and tested according to the procedures disclosed in Examples 1 and 2, above. The examples include, but are not limited to, several material formulae set forth in Table 5 having higher y and/or z values compared to the formulae disclosed above.

TABLE 5

| Designation | x | y | z | NaSICON Material Formula |
| --- | --- | --- | --- | --- |
| B-06 | 2 | 0 | 0.6 | $Na_{2.4}Zr_2Si_2PO_{11.7}$ |
| B-07 | 2 | 0.5 | 0.25 | $Na_{3.25}Y_{0.5}Zr_{1.5}Si_2PO_{11.875}$ |
| B-08 | 2 | 1 | 0.1 | $Na_{3.9}YZrSi_2PO_{11.95}$ |
| B-09 | 2 | 0.049 | 0.9 | $Na_{2.149}Y_{0.049}Zr_{1.951}Si_2PO_{11.55}$ |
| C-02 | 2.1 | 0.049 | 0.5 | $Na_{2.649}Y_{0.049}Zr_{1.951}Si_{2.1}P_{0.9}O_{11.75}$ |
| D-04 | 2.2 | 0 | 0.6 | $Na_{2.6}Zr_2Si_{2.2}P_{0.8}O_{11.7}$ |
| D-05 | 2.2 | 0.25 | 0.25 | $Na_{3.2}Y_{0.25}Zr_{1.75}Si_{2.2}P_{0.8}O_{11.875}$ |
| D-06 | 2.2 | 1 | 0.6 | $Na_{3.6}YZrSi_{2.2}P_{0.8}O_{11.7}$ |
| E-10 | 2.3 | 0 | 0.6 | $Na_{2.7}Zr_2Si_{2.3}P_{0.7}O_{11.7}$ |
| E-11 | 2.3 | 0.25 | 0.25 | $Na_{3.3}Y_{0.25}Zr_{1.75}Si_{2.3}P_{0.7}O_{11.875}$ |
| E-12 | 2.3 | 0.8 | 0.25 | $Na_{3.85}Y_{0.8}Zr_{1.2}Si_{2.3}P_{0.7}O_{11.875}$ |
| E-13 | 2.3 | 1 | 0.45 | $Na_{3.85}YZrSi_{2.3}P_{0.7}O_{11.775}$ |
| F-03 | 2.35 | 0.049 | 0.8 | $Na_{2.599}Y_{0.049}Zr_{1.951}Si_{2.35}P_{0.65}O_{11.6}$ |
| G-07 | 2.4 | 0.12 | 0.9 | $Na_{2.62}Y_{0.12}Zr_{1.88}Si_{2.4}P_{0.6}O_{11.55}$ |
| G-08 | 2.4 | 0 | 0.5 | $Na_{2.9}Zr_2Si_{2.4}P_{0.6}O_{11.75}$ |
| G-09 | 2.4 | 0.4 | 0.3 | $Na_{3.5}Y_{0.4}Zr_{1.6}Si_{2.4}P_{0.6}O_{11.85}$ |
| G-10 | 2.4 | 0.9 | 0.5 | $Na_{3.8}Y_{0.9}Zr_{1.1}Si_{2.4}P_{0.6}O_{11.75}$ |

The NaSICON compositions within the scope of the present invention, including but not limited to the compositions disclosed in Table 5, are expected to be chemically stable from exposure to inorganic contaminant ions such as K$^+$, Cs$^+$, H$^+$ present in the mixed sodium salt chemistries during operation in electrochemical cells. The NaSICON membrane compositions will also exhibit sodium ion conductivity of greater than $1 \times 10^{-4}$ S/cm at ambient temperatures to allow operation of cell above 50 mA/cm$^2$ current density and >than 100 mA/cm$^2$ current density.

While the foregoing examples disclose sodium ion conductive ceramic materials, the invention is not limited to sodium ion conductive NaSICON-type materials. The invention includes metal ion conductive MeSICON ceramic materials which conduct cations including, but not limited to, Na$^+$, Li$^+$, K$^+$, Rb$^+$, Cs$^+$, or Ag$^+$, or mixtures thereof. Such MeSICON ceramic materials are expected to exhibit chemical stability, metal ion conductivity, and current density the same or similar to the NaSICON-type materials disclosed above.

In some specific embodiments, the metal ion conductive ceramic material may include at least one of the following features and use characteristics, as would be understood by one of ordinary skill in the art: a solid form; a high alkali ion conductivity at temperatures below about 100° C.; low electronic conductivity; an alkali-ion transfer efficiency (i.e. high transference number) greater than about 95%; a high selectivity for particular alkali cations (e.g. Na$^+$) in relation to other alkali or non-alkali cations; stability in solutions of alkali-ion containing salts and chemicals of weak or strong organic or inorganic acids; a density greater than about 95% of theoretical density value; substantially impermeable to water transport; resistant to acid, alkaline, caustic and/or corrosive chemicals.

The metal ion conducting ceramic materials disclosed herein may be used or produced in any suitable form as would be understood by one of ordinary skill in the art. In some specific embodiments, the form of the metal ion conducting ceramic material may be a membrane and may include at least one of the following: monolithic flat plate geometries, supported structures in flat plate geometries, monolithic tubular geometries, supported structures in tubular geometries, monolithic honeycomb geometries, or supported structures in honeycomb geometries. In another embodiment, the metal ion conducting membrane may be a supported membrane or structure known to those of skill in the art. Supported structures or membranes may comprise dense layers of metal ion conducting ceramic material supported on porous supports. A variety of forms for the supported membranes are known in the art and would be suitable for providing the supported membranes for metal ion conducting ceramic membranes with supported structures, including, but not limited to: ceramic layers sintered to below full density with resultant continuous open porosity, slotted-form layers, perforated-form layers, expanded-form layers including a mesh, or combinations thereof. In some embodiments, the porosity of the porous supports is substantially continuous open-porosity so that the liquid solutions on either side of the metal ion conducting ceramic membrane may be in intimate contact with a large area of the dense-layers of metal ion conducting ceramic material, and in some, the continuous open-porosity ranges from about 30 volume % to about 90 volume %. In some embodiments of the present invention, the porous supports for the supported structures may be present on one side of the dense layer of metal ion conducting ceramic material. In some embodiments of the present invention, the porous supports for the supported structures may be present on both sides of the dense layer of metal ion conducting ceramic material.

A variety of materials for the porous supports or supported membranes are known in the art and would be suitable for providing the porous supports for metal ion conducting ceramic membranes with supported-structures, including: electrode materials, $\beta'$-alumina, $\beta''$-alumina, other ion-conducting ceramic solid electrolyte materials, and non-conductive materials such as plastics or ceramic materials, metals, and metal alloys. The thickness of the dense layer of metal ion conducting ceramic material in monolithic structures may be generally from about 0.3 mm to about 5 mm, and in some instances from about 0.5 mm to about 1.5 mm. The thickness of the dense layer of metal ion conducting ceramic material in supported-structures may be generally from about 25 µm to about 2 mm, and often from about 0.5 mm to about 1.5 mm. Layers as thin as about 25 µm to about 0.5 mm are readily producible, as would be understood by one of ordinary skill in the art. In some specific embodiments, the metal ion conducting ceramic membranes are structurally supported by the cathode, which is porous. This may dictate characteristics of both the form of the alkali-ion conducting ceramic membranes, and/or of the cathode and/or anode. In some specific embodiments, the porous substrate has similar thermal expansion and good bonding with the metal ion conducting ceramic membrane as well as good mechanical strength. One of ordinary skill in the art would understand that the number and configuration of the layers used to construct the metal ion conducting ceramic membrane as supported-structures could be widely varied within the scope of the invention.

In some embodiments of the metal ion conducting ceramic materials disclosed herein, the metal ion conducting ceramic membranes may be composites of metal ion conducting ceramic materials with non-conductive materials, where the non-conductive materials are poor ionic and electronic electrical conductors under the conditions of use. A variety of insulative non-conductive materials are also known in the art, as would be understood by one of ordinary skill in the art. In some specific embodiments, the non-conductive materials may include at least one of the following: ceramic materials, polymers, and/or plastics that are substantially stable in the media to which they are exposed.

Layered metal ion conducting ceramic-polymer composite membranes are also particularly suitable for use as alkali-ion conducting ceramic membranes in the present invention. Layered alkali-ion conducting ceramic-polymer composite membranes generally comprise ion-selective polymers layered on metal ion conducting ceramic materials. Ion-selective polymer materials have the disadvantage of having poor selectivity to sodium ions, yet they demonstrate the advantage of high chemical stability.

In some specific embodiments, the metal ion conducting ceramic membrane may comprise two or more co-joined layers of different metal ion conducting ceramic materials. Such co-joined metal ion conducting ceramic membrane layers could include MeSICON materials disclosed herein joined to other metal ion conducting ceramic materials, such as, but not limited to, beta-alumina. Such co-joined layers could be joined to each other using a method such as, but not limited to, thermal spraying, plasma spraying, co-firing, joining following sintering, etc. Other suitable joining methods are known by one of ordinary skill in the art and are included herein.

From an energy efficiency standpoint, very thin metal ion conducting ceramic membranes are preferred. These have the smallest ohmic resistance and energy loss. Thin sheets of MeSICON, for example, can be formed by tape casting. Sheets as thin as about 50 micrometers to 0.5 mm are readily producible. Such thin sheets are preferably supported on or between porous structural supports. Such structural supports may be the electrodes or porous ceramic sheets or plates. The porosity of such ceramic supports is preferably quite high so that the liquid solutions on either side of the supports may be in intimate contact with a large area of the electrolyte membrane. Porosity, as a percent of total volume for electrolyte supports, ranges from about 30 to about 70% porosity. The porous substrate must have similar thermal expansion and good bonding with the metal ion conducting membrane as well as good mechanical strength. If electrode materials are utilized as structural supports, then similar characteristics for these must be present.

The metal ion conducting ceramic solid electrolyte materials disclosed herein are particularly suitable for use in the electrolysis of alkali metal based salt solutions because they have high ion-conductivity for alkali metal cations at low temperatures, high selectivity for alkali metal cations, good current efficiency and stability in water and corrosive media under static and electrochemical conditions. Comparatively, beta alumina is a ceramic material with high ion conductivity at temperatures above 300° C., but has low conductivity at temperatures below 100° C., making it less practical for applications below 100° C.

Metal ion conducting ceramic membranes comprising MeSICON materials of the type described herein, have low or negligible electronic conductivity, and as such aid in virtually eliminating the occurrence of any galvanic reactions when the applied potential or current is removed. The MeSICON materials according to the present invention have very mobile cations that provide high ionic conductivity, low electronic conductivity and comparatively high corrosion resistance.

One of ordinary skill in the art would understand that a number of ceramic powder processing methods are known for processing of the metal ion conducting ceramic materials such as high temperature solid-state reaction processes, co-precipitation processes, hydrothermal processes, or sol-gel processes. In some embodiments of the present invention it may be advantageous to synthesize the metal ion conducting ceramic materials by high temperature solid-state reaction processes. One non-limiting fabrication process proceeds as follows. Metal ion conducting ceramic materials may be systematically synthesized by solid-state oxide mixing techniques. A mixture of the starting precursors may be mixed in methanol in polyethylene jars, and the mixed precursor oxides are dried at 60° C. to evolve the solvent. The dried powder or material may be calcined from about 800° C. to about 1200° C. dependent on the composition, followed by milling of the calcined powder with media such as stabilized-zirconia or alumina or another media known to one of ordinary skill in the art to achieve the prerequisite particle size distribution. To achieve the prerequisite particle size distribution, the calcined powder may be milled using a technique such as vibratory milling, attrition milling, jet milling, ball milling, or another technique known to one of ordinary skill in the art, using media (as appropriate) such as stabilized-zirconia or alumina or another media known to one of ordinary skill in the art.

One of ordinary skill in the art would understand that a number of conventional ceramic fabrication processing methods are known for processing ceramic membranes such as those set forth above in a green-form. Such methods include, but are not limited to, tape casting, calendaring, embossing, punching, laser-cutting, solvent bonding, lamination, heat lamination, extrusion, co-extrusion, centrifugal casting, slip casting, gel casting, die casting, pressing, isostatic pressing, hot isostatic pressing, uniaxial pressing, and sol gel processing. The resulting green form ceramic membrane may then be sintered to form an alkali cation-conductive ceramic membrane using a technique known to one of ordinary skill in the art, such as conventional thermal processing in air, or controlled atmospheres to minimize loss of individual components of the alkali cation-conductive ceramic membranes. In some embodiments of the present invention it may be advantageous to fabricate the ceramic membrane in a green form by die-pressing, optionally followed by isostatic pressing. In other embodiments of the present invention it may potentially be advantageous to fabricate the ceramic membrane as a multi-channel device in a green form using a combination of techniques such as tape casting, punching, laser-cutting, solvent bonding, heat lamination, or other techniques known to one of ordinary skill in the art. Specifically, for NaSICON-type materials, a ceramic membrane in a green-form may be green-formed by pressing in a die, followed by isostatic pressing and then sintering in air in the range of from about 925° C. to about 1300° C. for up to about 8 hours to make sintered metal ion conductive ceramic membrane structures with dense layers of metal ion conductive ceramic materials. Standard x-ray diffraction analysis techniques may be performed to identify the crystal structure and phase purity of the metal ion conductive ceramic materials in the sintered ceramic membrane.

In some specific embodiments, metal ion conductive ceramic membranes for use in the processes and apparatus of the present invention may be fabricated by a vapor deposition method onto a porous support, including at least one of the following methods: physical vapor deposition, chemical vapor deposition, sputtering, thermal spraying, or plasma spraying. The thickness of the metal ion conductive ceramic membrane formed by a vapor deposition method onto a porous support is generally from about 1 μm to about 100 μm, but may be varied as is known to one of ordinary skill in the art.

One of the significant advantages of the instant invention is that the metal ion conductive ceramic materials disclosed herein are impermeable to both the catholyte and anolyte solution. A distinct advantage of the ceramic materials disclosed herein is their low (negligible) electronic conductivity, virtually eliminating any galvanic reactions from occurring when an applied potential or current is removed. Ceramic membranes typically are very selective to a specific ion and hence have a high transference number of preferred species, implying very low efficiency loss due to electro dialysis or dialysis. Polymeric membranes generally have low transference number of preferred species and, therefore, have low current efficiency (<60%) due to electro dialysis.

The metal ion conducting ceramic materials disclosed herein may advantageously be used in electrochemical processes that would benefit from low temperature operation, high selectivity for the metal ions, good current efficiency and stability in water and corrosive media under static and electrochemical conditions. Non-limiting examples of such processes include electrodialysis, salt splitting, and electro-synthesis of value added sodium or alkali based chemicals from aqueous and non-aqueous alkali salt.

Metal ion conducting ceramic materials disclosed may be fabricated into thin membranes that have the following characteristics: (1) Being dense, the membrane is impervious to water transport, and is not influenced by scaling or precipitation of divalent, trivalent, tetra valent ions or dissolved solids present in anolyte or catholyte solutions; (2) The membrane does not degrade in the presence of corrosive elements; (3) The membrane can be operated in a wide pH range (2 to 14); (4) The membrane selectively transports alkali ions (such as sodium) in the presence of other ions at very high electrical efficiency (>95%); and (5) The membrane provides the added benefits of very low parasitic, losses due to the absence of fouling by precipitants, or electro osmotic transport of $H_2O$, which are common with organic or polymer membranes.

While specific embodiments of the present invention have been illustrated and described, numerous modifications come to mind without significantly departing from the spirit of the invention, and the scope of protection is only limited by the scope of the accompanying claims.

References

1. Hong, H. Y. P., *Crystal structures and crystal chemistry in the system $Na_{1+x}Zr_2Si_xP_{3-x}O_{12}$*. Materials Research Bulletin, 1976. 11(2): p. 173-182.

2. Miyajima, Y., et al., *Solubility range and ionic conductivity of large trivalent ion doped $Na_{1+x}M_xZr_{2-x}P_3O_{12}$ (M: In, Yb, Er, Y, Dy, Tb, Gd) solid electrolytes*. Solid State Ionics, 1999. 124(3-4): p. 201-211.

3. Fan, R.-q., W.-j. Wang, and F.-x. Chen, *Synthesis and characterization of sodium fast ion conductors in $Na_{1+2x+y}Al_xEu_yTi_{2-x-y}Si_xP_{3-x}O_{12}$ system*. 2002. 30(1): p. 102-105

4. Tillement, O., et al., *Mixed conductivity of the NASICON phase $Na_{2+x+y}Zr_{1-y}FeII_xFeIII_{1-x+y}(PO_4)_3$*. Solid State Ionics, 1991. 44(3-4): p. 299-303.

5. Mariappan, C. R. and G. Govindaraj, *Frequency dependent electrical properties of the $Na_3Fe_2P_3O_{12}$ and $Na_4FeCdP_3O_{12}$ NASICON material*. 2002: p. 629-636.

6. Fuentes, R. O., et al., *Submicrometric NASICON ceramics with improved electrical conductivity obtained from mechanically activated precursors*. Journal of the European Ceramic Society, 2005. 25(4): p. 455-462.

7. Fuentes, R. O., et al., *Influence of microstructure on the electrical properties of NASICON materials*. Solid State Ionics, 2001. 140(1-2): p. 173-179.

8. Fuentes, R. O., et al., *Reaction of NASICON with water*. Solid State Ionics, 2001. 139(3-4): p. 309-314.

9. Fuentes, R., et al., *Optimised NASICON ceramics for Na+ sensing*. Ionics, 2002. 8(5): p. 383-390.

10. Smirnova, O. A., et al., *Stability and Thermal Expansion of Na+-Conducting Ceramics*. Journal of Electroceramics, 2003. 11(3): p. 179-189.

11. Clearfield, A., et al., *Preparation of sodium zirconium phosphates of the type $Na_{1+4x}Zr_{2-x}(PO_4)_3$*. Materials Research Bulletin, 1983. 18(12): p. 1561-1567.

12. Rudolf, P. R., et al., *The crystal structure of a nonstoichiometric NASICON*. Materials Research Bulletin, 1985. 20(6): p. 643-651.

13. Von Alpen, U., M. F. Bell, and H. H. Höfer, *Compositional dependence of the electrochemical and structural parameters in the Nasicon system* ($Na_{1+x}Si_xZr_2P_{3-x}O_{12}$). Solid State Ionics, 1981. 3-4: p. 215-218.

14. Delmas, C., A. Nadiri, and J. L. Soubeyroux, *The NASICON-type titanium phosphates $ATi_2(PO_4)_3$ (A=lithium, sodium) as electrode materials*. Solid State Ionics, 1988. 28-30(Pt. 1): p. 419-23.

15. Tillement, O., et al., Crystal chemistry and electrical study of sodium niobium titanium phosphate ($Na_xNbTi(PO_4)_3$). Solid State Ionics, 1991. 48(3-4): p. 249-55.

16. Tillement, O., et al., *Electrochemical studies of mixed valence Nasicon*. Solid State Ionics, 1992. 53-56(Pt. 1): p. 391-9.

17. Znaidi, L., S. Launay, and M. Quarton, *Crystal chemistry and electrical properties of $Na_{1+x}ScNb(PO_4)_3$ phases*. Solid State Ionics, 1997. 93(3,4): p. 273-277.

18. Stratichuk, D. A., et al., *Insertion of Li, Na, K, Rb, and Cs in the unfilled structure of $Nb_2(PO_4)_3$*. Zhurnal Neorganicheskoi Khimii, 2001. 46(9): p. 1449-1452.

19. Patoux, S., et al., Structural and Electrochemical Studies of Rhombohedral $Na_2TiM(PO_4)_3$ and $Li_{1.6}Na_{0.4}TiM(PO_4)_3$ (M=Fe, Cr) Phosphates. 2003. 15(10): p. 2084-2093.

The invention claimed is:

1. A metal ion conducting ceramic material having a structure providing high metal cation conductivity having the general formulation:

$$Me_{1+x+y-z}M^{III}_yM^{IV}_{2-y}Si_xP_{3-x}O_{12-z/2}$$

wherein Me is $Na^+$, $Li^+$, $K^+$, $Rb^+$, $Cs^+$, $Ag^+$, or mixtures thereof, $2.0 \leq x \leq 2.4$, $0.0 \leq y \leq 1.0$, and $0.25 \leq z \leq 0.9$, where $M^{III}$ is $Al^{3+}$, $Ga^{3+}$, $Cr^{3+}$, $Sc^{3+}$, $Fe^{3+}$, $In^{3+}$, $Yb^{3+}$, $Y^{3+}$, or mixtures thereof and $M^{IV}$ is $Ti^{4+}$, $Zr^{4+}$, $Hf^{4+}$, or mixtures thereof.

2. The metal ion conducting ceramic material according to claim 1, wherein $0.5 \leq z \leq 0.9$.

3. A metal ion conducting ceramic material having a structure providing high metal cation conductivity having the general formulation:

$$Me_{1+x+y-z}M^{III}_yM^{IV}_{2-y}Si_xP_{3-x}O_{12-z/2}$$

wherein Me is $Na^+$, $Li^+$, $K^+$, $Rb^+$, $Cs^+$, $Ag^+$, or mixtures thereof, $2.0 \leq x \leq 2.4$, $0.0 \leq y \leq 1.0$, and z is about 0.8 or about 0.9, where $M^{III}$ is $Al^{3+}$, $Ga^{3+}$, $Cr^{3+}$, $Sc^{3+}$, $Fe^{3+}$, $In^{3+}$, $Yb^{3+}$, $Y^{3+}$, or mixtures thereof and $M^{IV}$ is $Ti^{4+}$, $Zr^{4+}$, $Hf^{4+}$, or mixtures thereof.

4. The metal ion conducting ceramic material according to claim 1, wherein Me is an alkali metal ion.

5. The metal ion conducting ceramic material according to claim 1, wherein $2.2 \leq x \leq 2.4$.

6. The metal ion conducting ceramic material according to claim 1, wherein $0.0 \leq y \leq 0.12$.

7. The metal ion conducting ceramic material according to claim 1, wherein x is about 2.2, y is about 0.05, and z is about 0.9.

8. The metal ion conducting ceramic material according to claim 1, wherein x is about 2.3, y is about 0.0, and z is about 0.9.

9. The metal ion conducting ceramic material according to claim 1, wherein x is about 2.3, y is about 0.05, and z is about 0.8.

10. The metal ion conducting ceramic material according to claim 1, wherein x is about 2.4, y is about 0.0, and z is about 0.9.

11. The metal ion conducting ceramic material according to claim 1, wherein x is about 2.4, y is about 0.0, and z is about 0.8.

12. The metal ion conducting ceramic material according to claim 1, further comprising partial substitution of Me with a different alkali metal ion or monovalent metal ion selected from $Na^+$, $Li^+$, $K^+$, $Rb^+$, $Cs^+$, $Ag^+$, or mixtures thereof.

13. A sodium ion conducting ceramic material having a structure providing sodium ion conductivity having the general formulation:

$$Me_{1+x+y-z}Y_yZr_{2-y}Si_xP_{3-x}O_{12-(z/2)}$$

wherein Me comprises $Na^+$, wherein $2.0 \leq x \leq 2.4$, $0.0 \leq y \leq 0.12$, and z is about 0.8 or about 0.9.

14. The sodium ion conducting ceramic material according to claim 13, wherein Me further comprises a partial substitution of sodium ions with an alkali metal ion or monovalent metal ion selected from $Li^+$, $K^+$, $Rb^+$, $Cs^+$, $Ag^+$, or mixtures thereof.

15. The sodium ion conducting ceramic material according to claim 13, wherein $2.2 \leq x \leq 2.4$.

16. The metal ion conducting ceramic material according to claim 13, wherein $0.0 \leq y \leq 0.12$.

17. The sodium ion conducting ceramic material according to claim 13, wherein x is about 2.2, y is about 0.05, and z is about 0.9.

18. The sodium ion conducting ceramic material according to claim 13, wherein x is about 2.3, y is about 0.0, and z is about 0.9.

19. The sodium ion conducting ceramic material according to claim 13, wherein x is about 2.3, y is about 0.05, and z is about 0.8.

20. The sodium ion conducting ceramic material according to claim 13, wherein x is about 2.4, y is about 0.0, and z is about 0.9.

21. The sodium ion conducting ceramic material according to claim 13, wherein x is about 2.4, y is about 0.0, and z is about 0.8.

* * * * *

UNITED STATES PATENT AND TRADEMARK OFFICE
CERTIFICATE OF CORRECTION

| | | |
|---|---|---|
| PATENT NO. | : 8,246,863 B2 | Page 1 of 1 |
| APPLICATION NO. | : 12/492834 | |
| DATED | : August 21, 2012 | |
| INVENTOR(S) | : Balagopal et al. | |

It is certified that error appears in the above-identified patent and that said Letters Patent is hereby corrected as shown below:

In the Specification

Add the following immediately after the title in Column 1:

"U.S. GOVERNMENT INTEREST
   This invention was made with government support under Contract No. DE-FG07-04ID14622 awarded by the Department of Energy. The Government has certain rights in this invention.".

Signed and Sealed this
Fourteenth Day of April, 2015

Michelle K. Lee
*Director of the United States Patent and Trademark Office*